US008824406B2

(12) United States Patent
Sabella et al.

(10) Patent No.: US 8,824,406 B2
(45) Date of Patent: Sep. 2, 2014

(54) ADAPTIVE SCHEDULING DATA TRANSMISSION BASED ON THE TRANSMISSION POWER AND THE NUMBER OF PHYSICAL RESOURCE BLOCKS (75) Inventors: Dario Sabella, Turin (IT); Marco Caretti, Turin (IT)

(73) Assignee: Telecom Italia S.p.A., Milan (IT)

( * ) Notice: Subject to any disclaimer, the term of this patent is extended or adjusted under 35 U.S.C. 154(b) by 59 days.

(21) Appl. No.: 13/519,012

(22) PCT Filed: Dec. 29, 2009

(86) PCT No.: PCT/EP2009/009299
§ 371 (c)(1),
(2), (4) Date: Jun. 25, 2012

(87) PCT Pub. No.: WO2011/079849
PCT Pub. Date: Jul. 7, 2011

(65) Prior Publication Data
US 2012/0287883 A1    Nov. 15, 2012

(51) Int. Cl.
*H04W 4/00*    (2009.01)
(52) U.S. Cl.
USPC .......................... 370/329; 370/330; 370/333
(58) Field of Classification Search
USPC .................................................. 370/329, 330
See application file for complete search history.

(56) References Cited

U.S. PATENT DOCUMENTS 7,702,350 B2 * 4/2010 Oh et al. ........................ 455/522
8,018,898 B2 * 9/2011 Ofuji et al. .................... 370/329
8,238,302 B2 * 8/2012 Ahn et al. ...................... 370/329
2004/0081181 A1 * 4/2004 Malkamaki ................... 370/410
2004/0252670 A1 * 12/2004 Rong et al. .................... 370/343
2009/0069057 A1   3/2009 Haartsen et al.
2009/0268693 A1 * 10/2009 Lindh et al. ................... 370/336
2010/0195614 A1 * 8/2010 Nimbalker et al. ........... 370/330

FOREIGN PATENT DOCUMENTS

| EP | 2034764 A1 | 3/2009 |
| EP | 2081314 A2 | 7/2009 |
| EP | 2120471 A1 | 11/2009 |
| EP | 2120473 A1 | 11/2009 |
| WO | 2009/034089 A1 | 3/2009 |

OTHER PUBLICATIONS

International Search Report mailed Jun. 16, 2010, PCT/EP2009/009299.

(Continued)

*Primary Examiner* — Ricky Ngo
*Assistant Examiner* — Dewanda Samuel
(74) *Attorney, Agent, or Firm* — Banner & Witcoff, Ltd.

(57) ABSTRACT

A method of scheduling data transmission of transport blocks in an Orthogonal Frequency-Division Multiple Access communication system, wherein each of the transport blocks is transmitted with a respective transmission format and transmission power in a set of physical resource blocks in the frequency domain. The method identifies the relationship between transmission power and the block error rate for a set of transmission formats, and evaluates alternative transmission formats and different numbers of physical resource blocks for at least one of the transport blocks. The method determines a set of alternative transmission formats with different numbers of physical resource blocks, and determines a value indicating the total power difference required to transmit the transport block, while maintaining a target block error rate. The transport block is then transmitted with the alternative transmission format and different number of physical resource blocks if the value indicates that the total transmission power is less.

20 Claims, 7 Drawing Sheets (56) References Cited

OTHER PUBLICATIONS

Schurgers, Aberthorne, and Srivastava; "Modulation Scaling for Energy Aware Communication Systems", ISLPED'01, Aug. 6-7, 2001, Huntington Beach, California, USA.

3GPP TS 36.213 V8.7.0 (May 2009) 3rd Generation partnership Project; Technical Specification Group Radio Access Network; Evolved Universal Terrestrial Radio Access (E-UTRA); Physical layer procedures (Release 8).

EP Examination Communication mailed Feb. 17, 2014, EP Appln. 09802114.0.

\* cited by examiner

| $I_{MCS}$ | $Q_m$ | $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | - |
| 30 | 4 |  |
| 31 | 6 |  |

| CQI | MOD | CR x 1024 | SE |
|---|---|---|---|
| 0 | | - | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Fig. 6

| TBS | $I_{TBS}, N_{PRB}$ | $I_{TBS}, N_{PRB}$ | $I_{TBS}, N_{PRB}$ | $I_{TBS}, N_{PRB}$ |
|---|---|---|---|---|
| 16 | (0,1) | n.a. | n.a. | n.a. |
| 24 | (1,1) | n.a. | n.a. | n.a. |
| 32 | (2,1) | (0,2) | n.a. | n.a. |
| 40 | (3,1) | n.a. | n.a. | n.a. |
| 56 | (4,1) | (1,2) | (0,3) | n.a. |
| ... | ... | ... | ... | ... |
| 1480 | (26,2) | (21,3) | (7,12) | ... |
| ... | ... | ... | ... | ... |

Fig. 7

| $I_{TBS}$ | $N_{PRB}$ | | | | | | | | |
|---|---|---|---|---|---|---|---|---|---|
| | 1 | 2 | 3 | 4 | 5 | 6 | 7 | 8 | ... |
| 0 | 16 | 32 | 56 | 88 | 120 | 152 | 176 | 208 | ... |
| 1 | 24 | 56 | 88 | 144 | 176 | 208 | 224 | 256 | ... |
| 2 | 32 | 72 | 144 | 176 | 208 | 256 | 296 | 328 | ... |
| 3 | 40 | 104 | 176 | 208 | 256 | 328 | 392 | 440 | ... |
| 4 | 56 | 120 | 208 | 256 | 328 | 408 | 488 | 552 | ... |
| 5 | 72 | 144 | 224 | 328 | 424 | 504 | 600 | 680 | ... |
| 6 | 328 | 176 | 256 | 392 | 504 | 600 | 712 | 808 | ... |
| 7 | 104 | 224 | 328 | 472 | 584 | 712 | 840 | 968 | ... |
| 8 | 120 | 256 | 392 | 536 | 680 | 808 | 968 | 1096 | ... |
| 9 | 136 | 296 | 456 | 616 | 776 | 936 | 1096 | 1256 | ... |
| 10 | 144 | 328 | 504 | 680 | 872 | 1032 | 1224 | 1384 | ... |
| ... | ... | ... | ... | ... | ... | ... | ... | ... | ... |

ADAPTIVE SCHEDULING DATA TRANSMISSION BASED ON THE TRANSMISSION POWER AND THE NUMBER OF PHYSICAL RESOURCE BLOCKS

CROSS REFERENCE TO RELATED APPLICATIONS

This is a U.S. National Phase Application under 35 U.S.C. §371 of International Application No. PCT/EP2009/009299, filed Dec. 29, 2009, which was published Under PCT Article 21(2), the entire contents of which are incorporated herein by reference.

FIELD OF THE INVENTION

This disclosure relates to techniques for scheduling data transmission in a communication system.

This disclosure has been developed with attention paid to its possible use in providing an energy efficiency downlink communication in an Orthogonal Frequency-Division Multiple Access communication network.

DESCRIPTION OF THE RELATED ART

The increasing energy demands in mobile networks require that the network elements of a communication network should be energy efficient. For example, this permits to reduce the power consumption and may decrease the operational costs of the network.

For example, energy efficiency is a well known issue in uplink (UL) communications between a mobile terminal and a base station.

For example, document US-A-2009/0069057 describes a solution for the uplink direction in order to minimize the power consumption of a mobile terminal. Specifically, the algorithm is based on the path loss and describes a particular type of transmission scheme depending on a request for resource allocation by the user equipment (UE) and a resource allocation by the Node B, i.e. the base station (BS).

However, only little attention has been paid so far to the downlink (DL) direction, and the majority of the currently used packet schedulers and resource allocators do not take into account energy efficiency at all, but only the maximization of the overall cell throughput, e.g., in order to guarantee fairness among the users.

For example, the article from Schurgers, Aberthorne, and Srivastava; "Modulation Scaling for Energy Aware Communication Systems", ISLPED'01, Aug. 6-7, 2001, Huntington Beach, Calif., USA, describes the usage of modulation scaling for energy saving purposes.

Moreover, document WO-A-2009/34089 discloses a solution for CDMA systems, wherein the power-aware link adaptation is based on throughput requirements and path losses.

OBJECT AND SUMMARY OF THE INVENTION

The inventors have noted that the above mentioned solutions may not be used to optimize energy efficiency in downlink (DL) direction without compromising QoS in an Orthogonal Frequency-Division Multiple Access (OFDMA) communication system, such as in a Long Term Evolution (LTE) or LTE-Advanced mobile network.

Moreover, the inventors have noted that a substantial modification of existing schedulers or resource allocators would be required in order to implement energy efficiency in DL direction.

The need is therefore felt for improved solutions that may dispense with such drawbacks.

According to the present invention, that object is achieved by means of a method having the features set forth in the claims that follow. The invention also relates to a corresponding base station, as well as a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is intended to highlight the possibility for the present invention to be implemented in a distributed/modular fashion.

The claims are an integral part of the disclosure of the invention provided herein.

Various embodiments provide a downlink scheduling and resource allocation, which takes into account also energy efficiency objectives.

In various embodiments, energy efficiency is achieved by modifying the decisions taken by a conventional packet scheduler or resource allocator already implemented in the base station of an OFDMA communication system, such as an extended Node B (eNB) of a LTE or LTE-Advanced system. For example, various embodiments provide an additional post-elaboration module for this purpose.

Various embodiments described herein do not change the expected average DL throughput of the overall cell. Conversely, the solutions described herein may be used with any scheduling algorithms already implemented in the base station.

In various embodiments, the base station has stored a link layer model, which describes the relationship between the transmission power, e.g. the signal to interferer plus noise ratio (SINR), and the block error rate (BLER) for a set of transmission formats.

In various embodiments the link layer model is used to evaluate alternative transmission formats and different numbers of physical resource blocks (PRBs) for the transmission of the transport blocks in a given Transmission Time Interval (TTI).

For example, in various embodiments, the base station determines a set of possible alternative transmission formats with a different number of physical resource blocks, and determines, based on the link layer model, a value being indicative for the total power difference required to transmit the transport block with the alternative transmission format and different number of physical resource blocks, while ensuring a target block error rate.

Finally, if the total transmission power is lower, the base station may transmit the transport block with the alternative transmission format and different number of physical resource blocks.

For example, in various embodiments, the base station evaluates alternative transmission formats, which have the same modulation.

Accordingly, the proposed solution provides energy savings, while the expected average DL throughput of the overall cell remains unchanged, i.e. the obtained transmitted power is always equal or smaller than the conventional one.

BRIEF DESCRIPTION OF THE ANNEXED REPRESENTATIONS

The invention will now be described, by way of example only, with reference to the enclosed representations, wherein.

DETAILED DESCRIPTION OF EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

As mentioned in the forgoing, various embodiments described herein provide arrangements, which perform scheduling and resource allocation by taking into account energy efficiency objectives.

Figure 1:
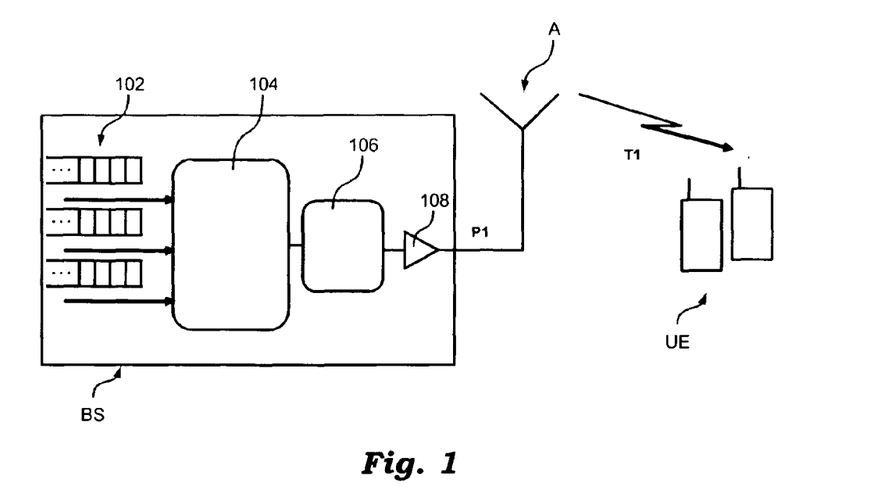
FIG. 1 shows a prior-art communication system.

FIG. 1 shows the structure of a conventional OFDMA communication system, comprising a base station BS (e.g. an eNB) of a LTE communication system, and a plurality of user equipments (UE), such as mobile terminals.

The base station BS comprises a plurality of queues 102 where data packets of respective data streams may be stored. For instance, the queues 102 may be implemented by means of First-In First-Out (FIFO) memories.

Subsequently, a scheduling module 104 performs the scheduling/resource allocation operation in order to select data packets to be transmitted in a specific Time Transmission Interval (TTI) and the resource grid is filled by allocating packets into Physical Resource Blocks (PRBs).

The PRBs are then transmitted in accordance with the selected transport format to the mobile terminals UE via a physical layer 106, a power amplifier 108, and an antenna A. In general, the transmission in a given TTI will have a RF power $P_1$ [W] and a data throughput $T_1$ [Mbps].

Figure 2:
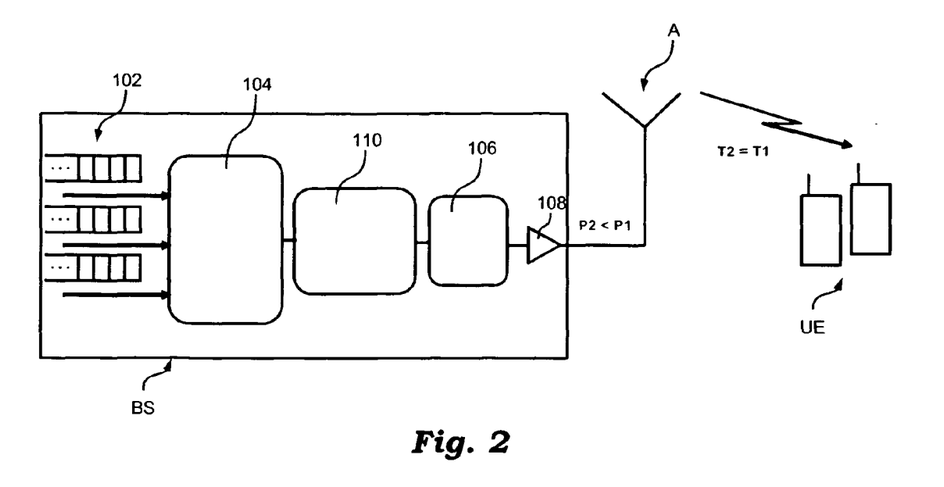
FIG. 2 shows an embodiment of a communication system comprising an energy efficiency post-elaboration block.

FIG. 2 shows a possible embodiment, wherein an energy efficiency (EE) post-elaboration block 110 has been inserted between the scheduler 104 and the physical layer 106. Similarly, also in this case, the transmission in a given TTI will have a RF power $P_2$ [W] and a data throughput $T_2$ [Mbps].

In various embodiment, the block 110 permits to decrease the DL transmitted power, i.e. $P_2 \leq P_1$, while maintaining the expected average throughput, i.e. $T_2 = T_1$.

In various embodiments, the block 110 is implemented by means of a control unit, e.g. by means of portions of software code running on a processing unit.

In various embodiments, the packet scheduling and resource allocation block 104 takes a preliminary decisions about the right Modulation and Coding Scheme (MCS) $I_{MCS}$ to be used for each scheduled transport block (TB) in order to guarantee the target transport Block Error Rate (BLER).

For example, according to the 3rd Generation Partnership Project (3GPP) LTE specifications, the MCS scheme $I_{MCS}$ corresponds to a certain modulation, with a modulation rate $Q_M$, and a certain transport block size (TBS) with index $I_{TBS}$.

Figure 3:
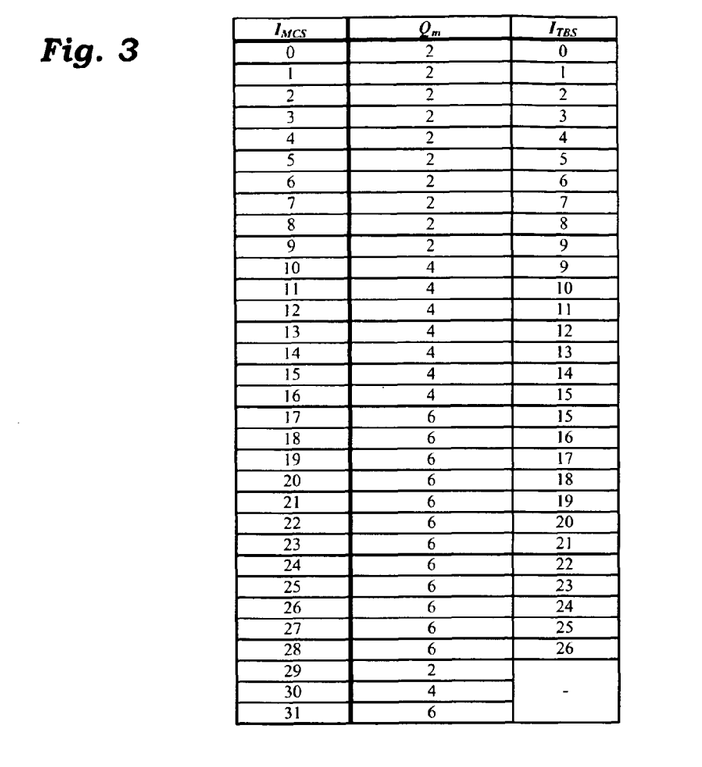
FIG. 3 shows a possible modulation and coding scheme table.

FIG. 3 shows in that respect a possible association between the MCS index $I_{MCS}$, the modulation rate $Q_M$ and the TBS index $I_{TBS}$ for a Physical Downlink Shared Channel (PDSCH), which corresponds to Table 7.1.7.1-1 in section 7.1.7.1 of the document 3GPP TS 36.213 V8.7.0 (2009-05) "3rd Generation Partnership Project; Technical Specification Group Radio Access Network; Evolved Universal Terrestrial Radio Access (E-UTRA); Physical layer procedures (Release 8)". In the example shown in FIG. 3, the modulation rate may be $Q_M=2$ for QPSK, $Q_M=4$ for 16 QAM, or $Q_M=6$ for 64 QAM.

In various embodiments, the block 110 modifies the scheduler's decisions, while maintaining the same target BLER. In fact, the inventors have noted that energy efficiency goals may be in contrast with Quality of Service (QoS) requirements and/or throughput maximization objectives. Accordingly, in various embodiments, the packet scheduler 104 may take decisions in order to satisfy QoS requirements, while the subsequent EE block 110 tries to make the transmission more efficient from an energetic point of view, without compromising QoS.

Figure 4:
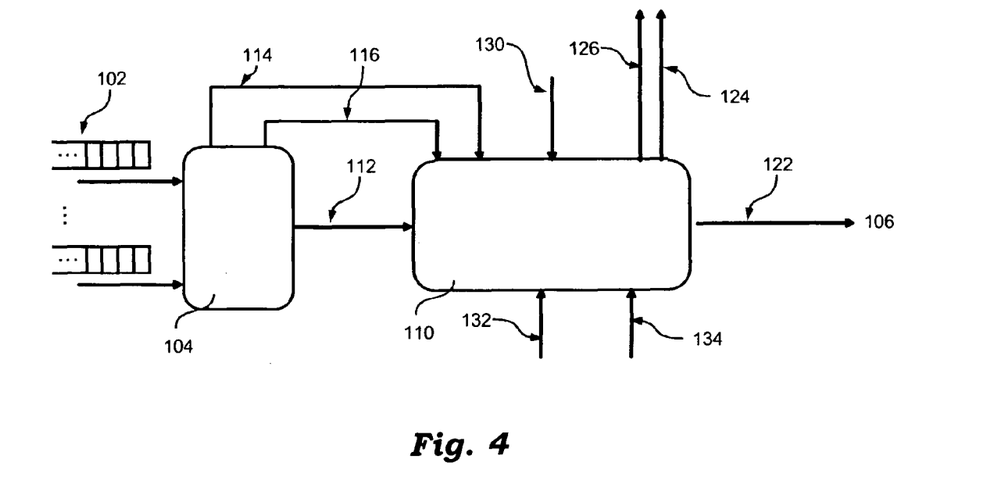
FIG. 4 shows an embodiment of the energy efficiency post-elaboration block of FIG. 2.

FIG. 4 shows a possible embodiment of the cooperation of the packet scheduler and resource allocator block 104 and the EE post-elaboration block 110.

In various embodiments, the EE post-elaboration block 110 receives from the packet scheduler 104 information 112, which identify the scheduled transport blocks for the considered TTI and the preliminary resource allocation (i.e. the respective frequency positions).

For example, in the case of an LTE system, the information 112 may include the set of scheduled transport blocks TB, and for each scheduled transport block $TB_k$ having a transport block size $TBS_k$, with k=1, 2, . . . , K, the position of the allocated PRBs in the considered TTI.

In various embodiments, the EE post-elaboration block 110 receives from the packet scheduler 104 for each TB in the TTI also the respective preliminary transmission format 114 (e.g. the number of PRBs for each packet, and the modulation and coding scheme) and the preliminary power levels 116 for transmission.

For example, in an LTE system, the preliminary transmission format 114 may include the following parameters for each scheduled transport block $TB_k$:
the transport block size of the k-th transport block $TBS_k$, e.g. expressed in bit;
the MCS scheme $I_{MCS}$ selected by the scheduler 104, which represents the chosen modulation rate $Q_m$ and TBS index $I_{TBS}$; and
the number of PRBs used $N_{PRB}$.

For example, in an LTE system, the preliminary power levels 116 may include a value $p_{input}(k)$, which identifies the PDSCH Energy per Resource Element (EPRE) for each scheduled transport block $TB_k$. Usually, in a conventional system, the value $p_{input}(k)$ is used to communicate to the higher levels the need to build dedicated RRC messages to inform the UEs about the current power level of PDSCH Resource Elements (REs).

In various embodiments, the block 110 receives also values 132, which identify the quality of the communication channels between the base station BS and the mobile terminals UE, and a link layer model 134.

For example, the considered embodiment the values 132 may be provided in the form of a Channel Quality Indicator (CQI) matrix regarding all the scheduled transport blocks in the TTI, wherein the CQI matrix may also be defined at PRB level.

For example, the CQI matrix C may contain CQI indexes $c(p,k)$ for each scheduled transport block $TB_k$ and each physical resource block $PRB_p$ in the bandwidth/position p.

For example, the CQI matrix C may contain CQI arrays $c(k)$ for each of the $k=1,\ldots,K$ transport blocks:

$$\underline{c}(k) = \begin{bmatrix} c(1,k) \\ c(2,k) \\ \vdots \\ c(p,k) \\ \vdots \\ c(P,k) \end{bmatrix}$$

Those of skill in the art will appreciate that the above formulation of the CQI array may apply in general, e.g. to an LTE system, even though in an LTE system CQI values may not be available for each PRB and/or a single CQI index may be associated to a plurality of PRBs.

Moreover, those of skill in the art will appreciate that CQI indexes are usually provided on a per-user-basis (i.e. per mobile terminal) and not on a per-transport-block basis. Possible solutions could be to transmit only one transport block for a respective user, or applying the same CQI index (or array) to all transport blocks of a given user. Therefore, without loss of generality, in the following description it will be assumed for simplicity that each transport block corresponds only to a single user.

In various embodiments, the CQI values are directly derived from feedback information provided by the mobile terminals UE.

Figure 5:
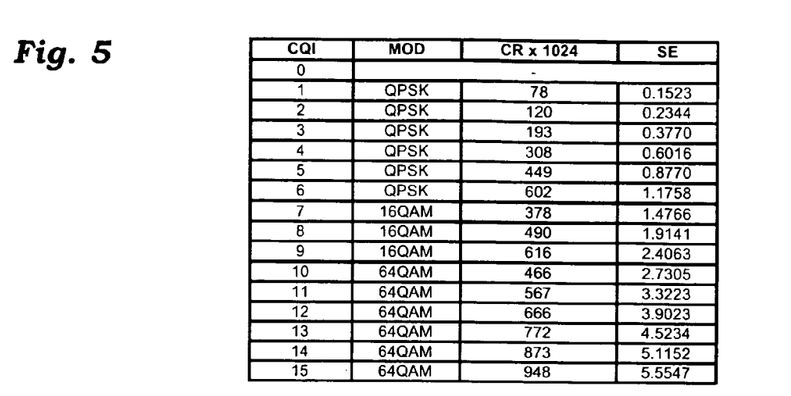
FIG. 5 shows a possible channel quality indicator table.

For example, FIG. 5 shows a possible definition of a 4-bit CQI index, which defines a respective modulation MOD and target code rate CR needed to guarantee a spectral efficiency SE for a transport block. Specifically, FIG. 5 corresponds to Table 7.2.3-1 in section 7.2.3 of the document 3GPP TS 36.213 V8.7.0 (2009 May) "3rd Generation Partnership Project; Technical Specification Group Radio Access Network; Evolved Universal Terrestrial Radio Access (E-UTRA); Physical layer procedures (Release 8)".

Also intermediate post-processing within the eNB may be used in order to calculate the channel quality values.

In various embodiments, the link layer model 134 defines for each transmission format permitted by the respective standard (e.g. for each transport block size TBS and each modulation rate $Q_m$) the respective working point in terms of signal to interferer plus noise ratio (SINR). For example, the link layer model 132 may be calculated dynamically, or pre-calculated and stored in a memory.

In various embodiments, the block 110 may also receive further information 130, such as the considered TTI and other related parameters.

In various embodiments, the above mentioned information is used to generate an update transmission format 124 and updated resource allocations 122.

For example, in various embodiments, the block 110 may change the number of redundancy bits used by the channel encoder. Accordingly, while the set of scheduled TBs remains unchanged, a different number of PRB may be used to transmit some of these TBs and/or the position of a subset of these packets may also be re-allocated in the TTI.

For example, the updated transmission format 124 may include the following parameters for each scheduled transport block $TB_k$:

the transport block size $TBS_k$ (which remains unchanged);
the MCS scheme $I_{MCS}$; and
the number of PRB used $N_{PRB}$.

The updated resource allocations 122 may include the set of scheduled TBs (which remain unchanged), and for each scheduled $TB_k$ (with length $TBS_k$) the position of the allocated PRBs in the considered TTI.

In various embodiments, the updated transport format 124 is provided to the encoder, while the updated resource allocations 122 are provided to the physical layer 106.

In various embodiments, the block 110 generate also updated power levels 126 to compensate the updated resource allocations 122 and updated transport formats 124.

For example, the updated power levels 126 may include for each scheduled $TB_k$ an updated power value $p_{output}(k)$ of PDSCH EPRE.

For example, the updated power levels may be provided to the higher layers in order to build RRC messages that may inform the terminals UE about the updated power level (PDSCH EPRE) of the modified subset of packets. For example, in various embodiments, the power levels related to unchanged packets remain the same and no corresponding RRC messages are built.

In various embodiments, the resource allocation block 110 performs the following operations:

1) initialization;
2) reception of inputs for the considered TTI;
3) choice of a subset of candidate transport blocks for the EE post-elaboration;
4) determination of an updated resource allocation, which considers also energy efficiency; and
5) production of outputs for the considered TTI.

In various embodiments, the updated solution is determined by performing for each transport block the steps of:

a) MCS remapping;
b) power adjustment; and
c) selection of the best EE solution.

In various embodiments, the above mentioned steps are performed for each TTI, i.e. each scheduling/resource allocation decision coming from the scheduler 104 is verified in order to produce at the output new updated scheduling/resource allocation decisions. The block 110 may also work in advance by looking at future TTIs, if preliminary scheduling/resource allocation decisions are available.

In the following will be described a possible embodiment of the solution in a 3GPP LTE base station, i.e. an eNB.

In various embodiments, the eNB performs the following initialization for each possible value for transport block size $TBS_k$ and for each transmission format permitted by the 3GPP standard. For example, the initialization may be performed during provisioning, dynamically, and/or in other preliminary phases, i.e. the initialization should merely be completed before the block 110 operates on the results from the scheduling block 104.

For example, in various embodiments, a lookup table is calculated in accordance with the 3GPP LTE specifications and stored in a memory.

Figure 6:
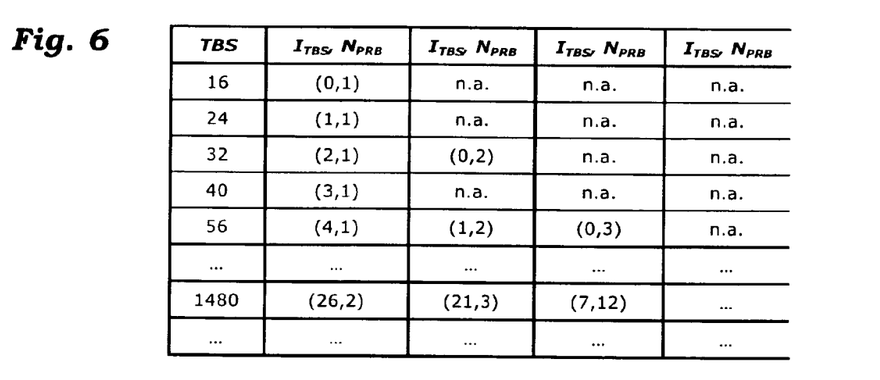
FIGS. 6 and 7 illustrate a possible association between a transport block size index, a number of physical resource blocks and the corresponding transport block size.

FIG. 6 shows in that respect a portion of a possible embodiment of this lookup table, which has been obtained by reordering the elements of Table 7.1.7.2.1-1 in section 7.1.7.2.1 of the document 3GPP TS 36.213 V8.7.0 (2009 May) "3rd Generation Partnership Project; Technical Specification Group Radio Access Network; Evolved Universal Terrestrial Radio Access (E-UTRA); Physical layer procedures (Release 8)", of which has also been reproduced a portion in FIG. 7.

Figure 7:
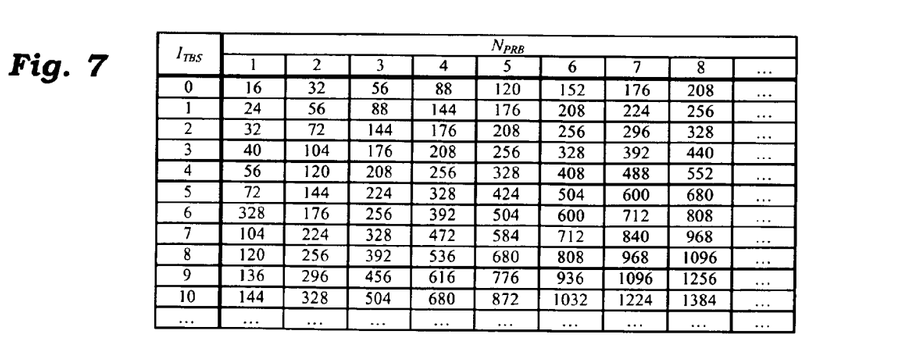

Specifically, each row of the table shown in FIG. 7 relates to a certain TBS index $I_{TBS}$ and contains the values for the transport block size TBS for the respective numbers of used PRBs $N_{PRB}$.

In the embodiment considered, the table shown in FIG. 6 has been obtained by reorganizing the table shown in FIG. 7 in order to list the transport block sizes TBS permitted by the Transport block size table.

In the embodiment considered all possible couples ($I_{TBS}$, $N_{PRB}$) are listed in ascending order of $N_{PRB}$ for each TBS permitted. For example, this may be done by just by looking for the occurrences of the same TBS in the transport block size table and by listing the corresponding couples ($I_{TBS}$, $N_{PRB}$) in an ordered way.

In the table shown in FIG. 6, the entry "n.a." represents that no further couple ($I_{TBS}$, $N_{PRB}$) was available for a given transport block size TBS.

In various embodiments, the eNB calculates (and possibly stores) also a set of gain elements a(i,j).

For example, given a certain transport block size TBS and a certain modulation rate $Q_m$ the gain element a(i,j) (expressed in dB) may be calculated as the power gain (or loss if positive) obtained to pass from the i-th transmission format to the j-th transmission format, while maintaining the same target block error rate $BLER_T$. This gain calculation may be done in the eNB by using its internal link layer models, e.g. link layer curves.

Figure 8:
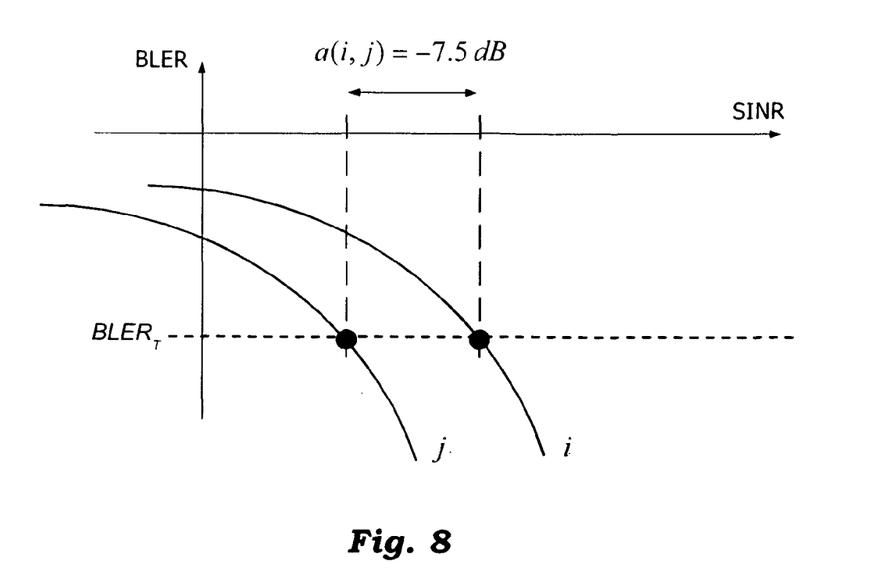
FIGS. 8 to 13 show possible link curves and resource allocations in order to illustrate a possible embodiment of the invention.

For example, FIG. 8 shows two possible link layer curves i and j, wherein each of the link layer curves provides the respective relationship between the signal to interferer plus noise ratio SINR and block error rate BLER.

For example, the gain element a(i,j) may be calculated as the gain (expressed in dB) in terms of SINR between two link curves (at a target block error rate $BLER_T$) for a given transmission format change:

$$a(i,j) = SINR_j - SINR_i$$

For example, in FIG. 8 the gain element a(i,j) would have a value of −7.5 dB when passing at a given target block error rate $BLER_T$ from the link curve i to the link curve j.

For example, in case the transport block size TBS is equal to 56 bit, the following possible transmission formats may exist (see FIG. 6):
  Transmission format #0, ($I_{TBS}$, $N_{PRB}$)=(4,1)
  Transmission format #1, ($I_{TBS}$, $N_{PRB}$)=(1,2)
  Transmission format #2, ($I_{TBS}$, $N_{PRB}$)=(0,3)

For example, starting from a conventional transmission format #1, the link layer curves may provide the following values (e.g. with a target $BLER_T$ of 0.1):
  a(1,0)=+3 dB,
  a(1,1)=0 dB (by definition);
  a(1,2)=7.5 dB.

As a consequence, passing from the transmission format i=1 to the transmission format j=2 would provide a gain of a(1,2)=−7.5 dB. Conversely, passing from the transmission format i=1 to the transmission format j=0 would provide a gain of a(1,0)=+3 dB.

In various embodiments, the eNB calculates (and possibly stores) also a set of PRB ratios.

For example, for every transport block size TBS permitted by the standard, the respective ratio b(i,j) representing the difference between the used number of PRB when passing from the i-th transmission format to the j-th transmission format (while maintaining the same modulation rate $Q_m$) may be calculated as:

$$b(i,j) = 10\log_{10}\frac{N_{PRB}(j)}{N_{PRB}(i)}$$

Accordingly, this definition represents the power change needed to compensate the transmission format change, without changing the modulation and the PDSCH EPRE of the considered data transmission.

For example, in case the transport block size TBS is equal to 56 bit, and when passing from i=1 to j=2, with:
  Transmission format #1, ($I_{TBS}$, $N_{PRB}$)=(1,2),
  Transmission format #2, ($I_{TBS}$, $N_{PRB}$)=(0,3),
while maintaining a QPSK modulation ($Q_m$=2), the PRB ratio may be calculated as:

$$b(1,2) = 10\log_{10}\frac{3}{2} = +1.76 \text{ dB}$$

Subsequently, during the normal processing, the block 110 receives at its input all the information coming from the existing scheduler 104. Specifically, each transport block $TB_k$ to be scheduled in a given TTI may be provided to the block 110.

In various embodiments, the block 110 receives also the following parameters:
  the transport block size $TBS_k$;
  the MCS scheme $I_{MCS}$ selected by the conventional scheduler 104 (this value represents chosen modulation rate $Q_m$ and TBS index $I_{TBS}$);
  the number of used PRB $N_{PRB}$, (this number represents the preliminary transmission format selected by the conventional scheduler); and
  the positions of all the allocated PRBs for the transport block $TB_k$ in the considered TTI.

In various embodiments, the scheduler 104 produces also a preliminary power value $p_{input}(k)$ of PDSCH EPRE for each scheduled $TB_k$.

Figure 9:
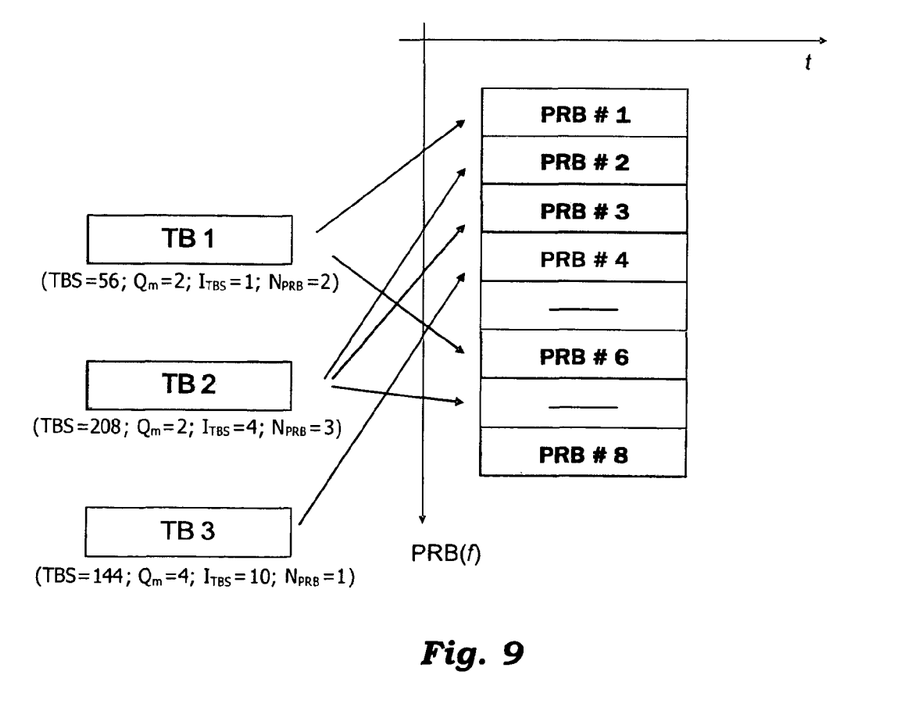

FIG. 9 shows an example of a conventional resource allocation in a TTI (in the time domain t), wherein without loss of generality only a limited number of eight PRB (in the frequency domain f) has been considered. In fact, the total number of available PRBs in a TTI depends on the bandwidth (for example, in an LTE system with a BW=20 MHz there are 100 PRB in frequency).

In the example considered, three transport blocks (or packets) are scheduled for transmission, wherein the three packets have the following transport formats:
  $TB_1$: TBS=56 (i.e. a transport block size of 56 bit), $Q_m$=2 (i.e. a QPSK modulation), $I_{TBS}$=1, and $N_{PRB}$=2;
  $TB_2$: TBS=208, $Q_m$=2, $I_{TBS}$=4, and $N_{PRB}$=3; and
  $TB_3$: TBS=144, $Q_m$=4 (i.e. a 16 QAM modulation), $I_{TBS}$=10, and $N_{PRB}$=1.

Accordingly, the first transport block $TB_1$ occupies two PRBs (e.g. PRBs #1 and #6), while the second transport block $TB_2$ occupies three PRBs (e.g. PRBs #2, #3 and #8), and the third transport block $TB_3$ occupies only one PRB (e.g. PRB #4). PRBs #5 and #7 remain unused. For example, only reference signals (RS) and the first OFDM symbols (occupied by control signaling) may be transmitted in PRBs #5 and #7, while the resource elements (RE) reserved for data are not transmitted.

In various embodiments, it will be assumed that the MCS schemes $I_{MCS}$ selected by the conventional scheduler 104 are coherent with the target BLER value. For example, the scheduler 104 may base its decision on CQI measurements coming from the mobile terminals.

Figure 10A:
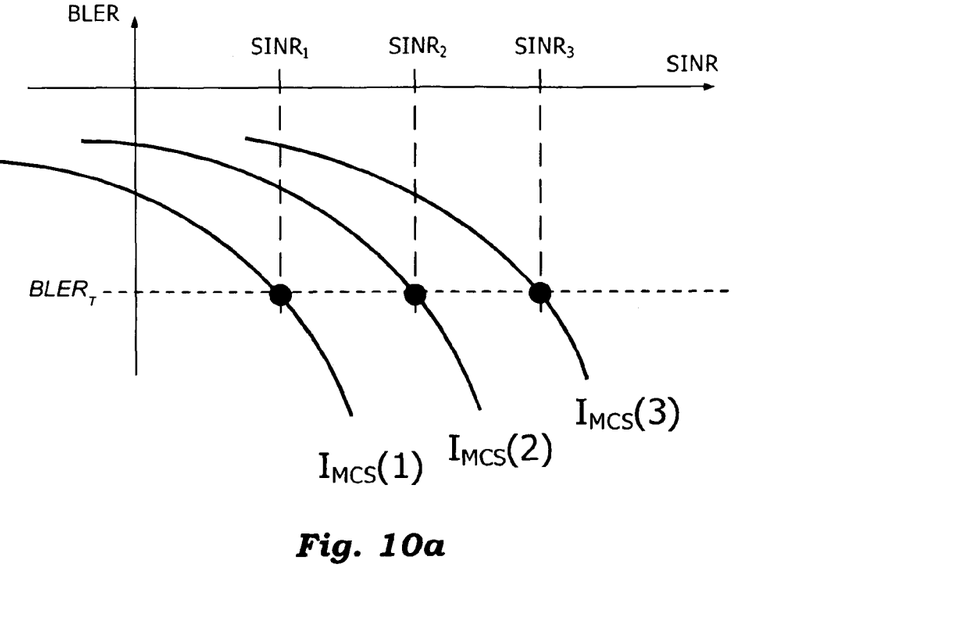
Figure 10B:
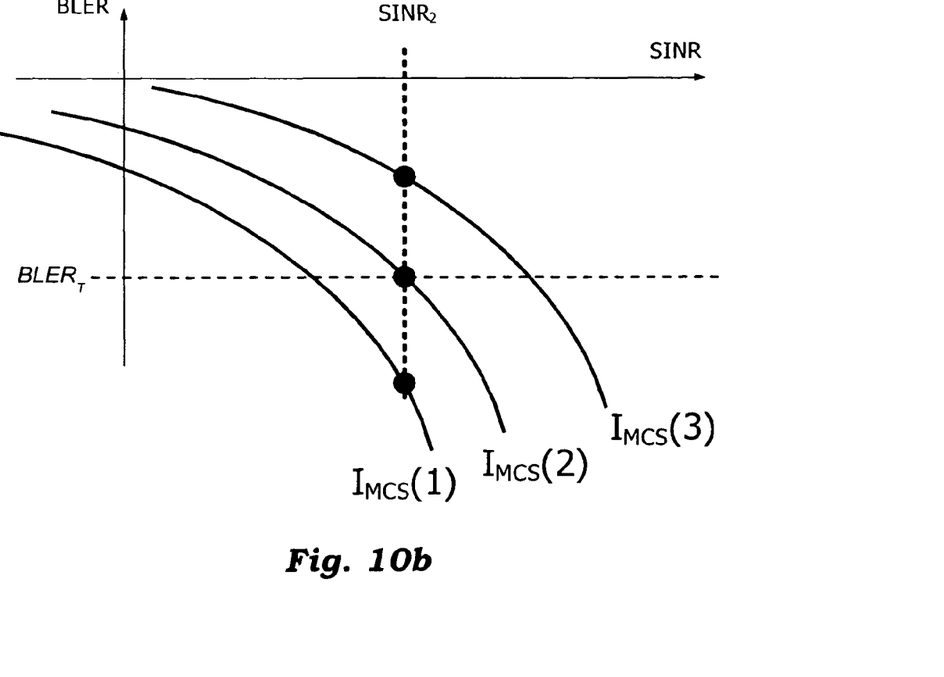

FIGS. 10a and 10b shows in that respect possible link curves which correspond to different MCS schemes, which may be used for a generic transport block $TB_k$.

Specifically, FIGS. 10a and 10b show possible link curves for the MCS schemes $I_{MCS}(1)$, $I_{MCS}(2)$ and $I_{MCS}(3)$.

As can be seen, each of the curves may have a different signal to interferer plus noise ratio threshold $SINR_1$, $SINR_2$, and $SINR_3$ for a given target block error rate $BLER_T$.

As a consequence, if a terminal experiments a certain working point in terms of perceived DL SINR, this means that (considering a certain value of PDSCH EPRE) not all MCS schemes are valid to guarantee a given target BLER, and because some of these schemes may offer higher BLER values for a given SINR working point.

For example, the link curve $I_{MCS}(3)$ placed on the right side of $I_{MCS}(2)$ intercepts the working point $SINR_2$ with a higher BLER value, while the curves $I_{MCS}(1)$ on the left side of $I_{MCS}(2)$ intercepts the working point $SINR_2$ with a lower BLER values.

This means that the link curve $I_{MCS}(3)$ may not satisfy the target BLER requirements, while $I_{MCS}(1)$ may be another possible candidate MCS scheme for $TB_k$.

In various embodiments, a CQI matrix C is provided at the input of the block 110.

In various embodiments, the matrix C contains for a given TTI the CQI indexes for each scheduled $TB_k$ and each PRB in the bandwidth.

For example, the CQI matrix may contain CQI indexes in a range between 1 and 15, with 0 being out-of-range (see e.g. FIG. 5):

$$\underline{C} = \begin{bmatrix} 1 & 5 & 9 \\ 2 & 4 & 8 \\ 3 & 5 & 6 \\ 2 & 3 & 6 \\ 1 & 2 & 5 \\ 1 & 2 & 5 \\ 2 & 3 & 5 \\ 2 & 4 & 4 \end{bmatrix}$$

wherein c(p,k) is the element in the p-th row and in the k-th column.

In various embodiments, considering the TTI configuration and all the inputs received from the conventional scheduler, the block 110 chooses a possible subset of transport blocks suitable for the application of the EE post-elaboration. For example, the particular rule applied to choose this subset may depend on the modulation used, the transmission format applied in the first stage by the existing scheduler/resource allocation block 104, the number and position of free PRBs in the considered TTI, and the availability of CQI measurements (if any) for each user in the different PRBs of the TTI.

In various embodiments, the block 110 performs the following operations for each $TB_k$ (candidate to be chosen for the application of the EE post-elaboration), with k=1, 2, ..., K:

calculation of an aggregated CQI index for all the values relative to the used PRBs;

comparison of the aggregated CQI index with the CQI values for the free PRBs.

Finally, the transport block $TB_k$ is selected, if the set $S_{EE}(k)$ of indexes of free PRBs suitable for the application of the EE post-elaboration for a given transport block $TB_k$ is not empty.

In various embodiment, the aggregated CQI index is calculated as the minimum $C_{MIN}(k)$ between all the CQI values c(p,k) belonging to the allocated PRBs (with index p) for a given $TB_k$:

$$c_{MIN}(k) = \min_p \{c(p,k)\}$$

Those of skill in the art will appreciate that the aggregated CQI index may also be determined in other way. Similarly, the hypothesis of the presence of a value c(p,k) for each PRB and for each user is only done in order to make the formulation of the CQI array as generic as possible.

In various embodiments, the aggregated CQI index of a given user or transport block k is compared with the CQI values c(q,k) of the free PRBs. For example, if $c(q, k) \geq c_{MIN}(k)$ then the PRB with index q may be used to transmit data for the respective transport block $TB_k$ and its position is stored.

Generally, if a PRB index belongs to different sets $S_{EE}(k)$, it may be used to transmit data for different users (or transport blocks). However, for the sake of simplicity, in the following description this particular case will not be treated specifically. However, such a condition may be managed, e.g., by choosing the $TB_k$ with the best CQI index. Moreover, conflicts in the PRB assignments could also be managed by comparing the overall power saving obtained with all the possible resource allocation solutions in the considered TTI, e.g. by means of iterative search of the best solution that maximizes the overall power saving.

For example, considering the following exemplary CQI matrix:

$$C = \begin{bmatrix} 1 & 5 & 9 \\ 2 & 4 & 8 \\ 3 & 5 & 6 \\ 2 & 3 & 6 \\ 1 & 2 & 5 \\ 1 & 2 & 5 \\ 2 & 3 & 5 \\ 2 & 4 & 4 \end{bmatrix}$$

and the preliminary resource allocation (see FIG. 9):

$TB_1$ is allocated to PRB #1 and PRB #6), $TB_2$ is allocated to PRB #2, PRB #3 and PRB #8), $TB_3$ is allocated to PRB #4, and PRB #5 and PRB #7 are unused.

it is possible to observe that for the transport block $TB_1$ the CQI indexes of the free PRBs (c(5,1)=1 and c(7,1)=2) are greater than or equal to the CQI indexes of the PRBs of $TB_1$ (c(1,1)=1 and c(6,1)=1). Therefore, the set of indexes of free PRBs suitable for the application of the EE post-elaboration for the transport block $TB_1$ would be $S_{EE}(1)=\{5,7\}$.

Conversely, the CQI indexes of the transport block $TB_2$ (c(2,2)=4, c(3,2)=5 and c(8,2)=4) are greater than the CQI indexes of the free PRBs (c(5,2)=2 and c(7,2)=3). Consequently, these free PRBs cannot be used to transmit data for the transport block $TB_2$, because the quality is less than the quality of the used PRBs (#2, #3 and #8), i.e. $S_{EE}(2)=\emptyset$.

Finally, the CQI index of the transport block $TB_3$ (c(4,3)=6) is greater than the CQI index of the free PRBs (c(5,3)=5 and c(7,3)=5). Consequently, also in this case, the set of indexes of free PRBs suitable for the application of the EE post-elaboration for the transport block $TB_3$ would be empty, i.e. $S_{EE}(3)=\emptyset$.

Consequently, in the above example, only the transport block $TB_1$ would be suitable for the application of the EE post-elaboration.

In various embodiments, the block 110 may perform two operations for each transport block $TB_k$:
- an $I_{MCS}$ remapping in order to verify the number and/or the position of PRBs needed to transmit the respective TB; and
- a modification of the transmission power.

Specifically, the power modification may be performed to compensate the effects of the remapping in the first phase, while maintaining the target quality and decreasing the total transmitted power for the respective TB.

In various embodiments, the block 110 tries to change the MCS scheme $I_{MCS}$, while maintaining the same modulation for the selected transport block $TB_k$.

Figure 11:
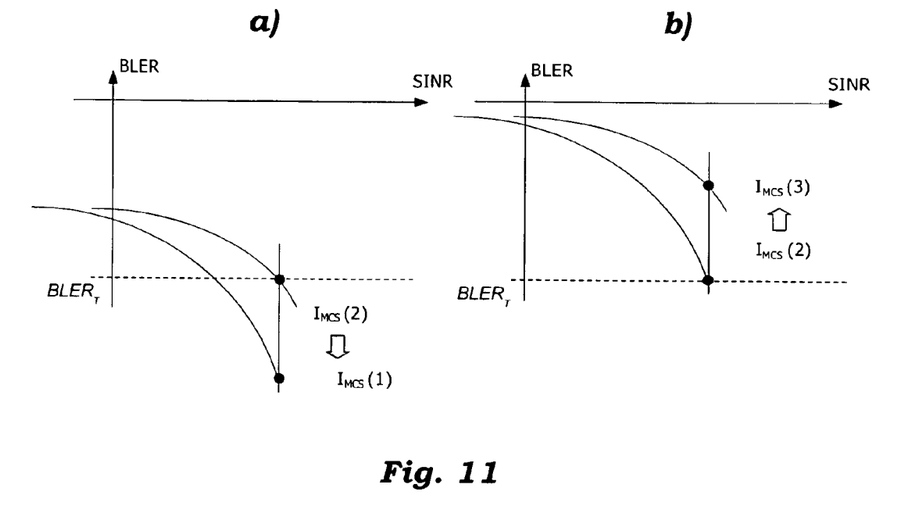

FIGS. 11a and 11b show exemplary embodiments for changing the MCS scheme $I_{MCS}$.

In the embodiment shown in FIG. 11a, the block 110 evaluates MCS schemes on the left side of the currently used MCS scheme, e.g. a passage from $I_{MCS}(2)$ to $I_{MCS}(1)$. Accordingly, the block 110 tries to increase redundancy by evaluating new couples ($I_{TBS}$, $N_{PRB}$) in order to increase the number of occupied PRBs.

In the embodiment shown in FIG. 11b, the block 110 evaluates MCS schemes on the right side of the currently used MCS scheme, e.g. a passage from $I_{MCS}(2)$ to $I_{MCS}(3)$. Accordingly, the block 110 tries to decrease redundancy by evaluating new couples ($I_{TBS}$, $N_{PRB}$) in order to decrease the number of occupied PRBs.

Those of skill in the art will appreciate that the operation of decreasing the number of occupied PRBs may be performed for all transport blocks, while the operation of increasing the transport blocks could only be performed if the CQI matrix indicated that some of the unused PRBs may be allocated, i.e. the respective set $S_{EE}$ is not empty.

As mentioned already in the forgoing, changing the MCS scheme may also affect the expected BLER and the total transmitted power, which is expressed by the parameters b(i,j) stored during the initialization phase.

For example, in the embodiment shown in FIG. 11a, it is possible to pass for the transport block $TB_1$ from the couple ($I_{TBS}$, $N_{PRB}$)=(1,2) to the new couple ($I_{TBS}$, $N_{PRB}$)=(0,3) by increasing the redundancy and decreasing the expected BLER. However, by increasing the number of PRBs, also the total transmitted power is increased and the parameter b(i,j) has the following value:

$$b(i, j) = 10\log_{10}\frac{N_{PRB}(j)}{N_{PRB}(i)} = 10\log_{10}\frac{3}{2} = +1.76 \text{ dB}$$

Figure 12A:
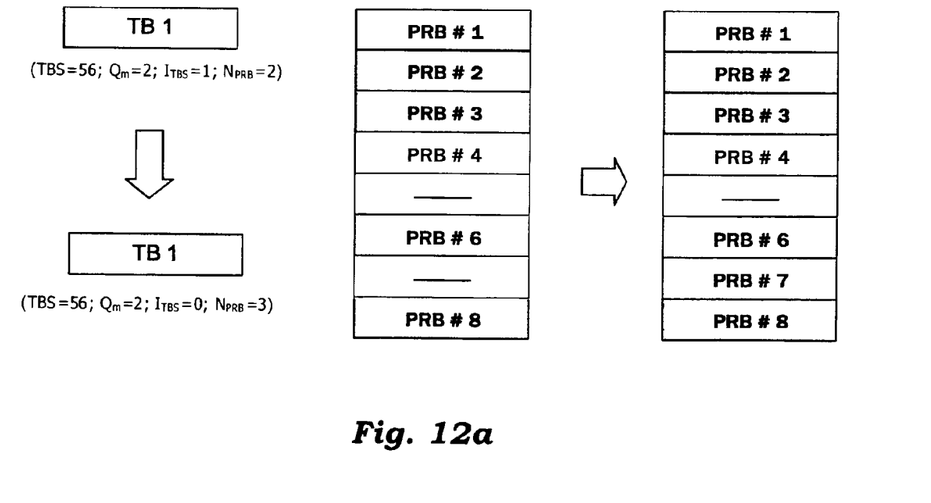

FIG. 12a shows in that respect a possible remapping of the transport block $TB_1$. In the example considered, the transport format for the transport block $TB_1$ changes from TBS=56, $Q_m$=2, $I_{TBS}$=1, $N_{PRB}$=2 to TBS=56, $Q_m$=2, $I_{TBS}$=0, $N_{PRB}$=3, and accordingly one of the free PRBs (e.g. PRB #7) is allocated additionally to the transport block $TB_1$.

For example, in the embodiment shown in FIG. 11b, it is possible to pass for the transport block $TB_1$ from the couple ($I_{TBS}$, $N_{PRB}$)=(1,2) to the new couple ($I_{TBS}$, $N_{PRB}$)=(4,1) by decreasing the redundancy and increasing the expected BLER. In this variant the total transmitted power is decreased and the parameter b(i,j) has the following value:

$$b(i, j) = 10\log_{10}\frac{N_{PRB}(j)}{N_{PRB}(i)} = 10\log_{10}\frac{1}{2} = -3 \text{ dB}$$

Figure 12B:
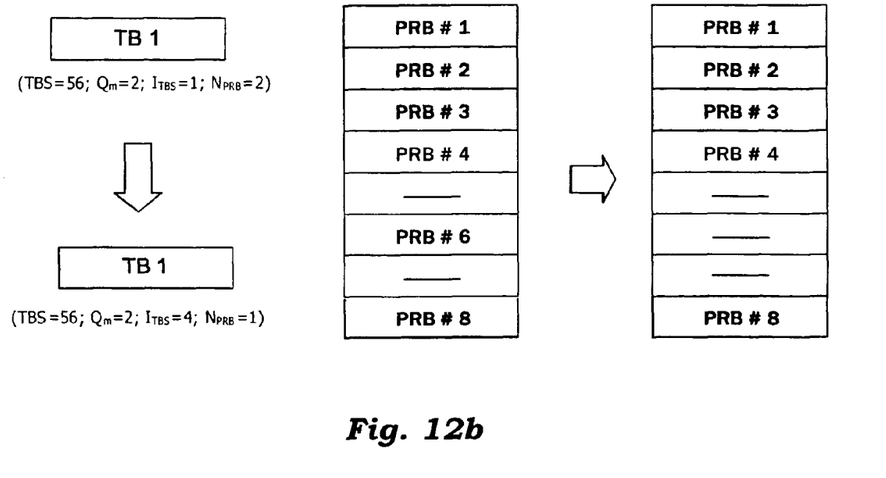

FIG. 12b shows in that respect a possible remapping of the transport block $TB_1$. In the example considered, the transport format for the transport block $TB_1$ changes from TBS=56, $Q_m$=2, $I_{TBS}$=1, $N_{PRB}$=2 to TBS=56, $Q_m$=2, $I_{TBS}$=4, $N_{PRB}$=1, and accordingly one of the PRBs (e.g. PRB #6) is removed.

The above embodiments may also be performed both in order to determine a set of MCS remapping opportunities, i.e. new couples ($I_{TBS}$, $N_{PRB}$) for each selected transport block $TB_k$.

In various embodiments, the MCS remapping opportunities are then stored for further processing.

In various embodiments, the block 110 tries to change the power level of PDSCH EPRE of the PRBs of a selected transport block $TB_k$. Similarly to the MCS remapping, also for the current step two possible variants are possible:
- decrease the power level of PDSCH EPRE in order to compensate a MCS remapping, which increases the TB redundancy, i.e. a increased number of occupied PRBs; or
- increase the power level of PDSCH EPRE in order to compensate a MCS remapping, which decreases the TB redundancy, i.e. a decreased number of occupied PRBs.

Figure 13:
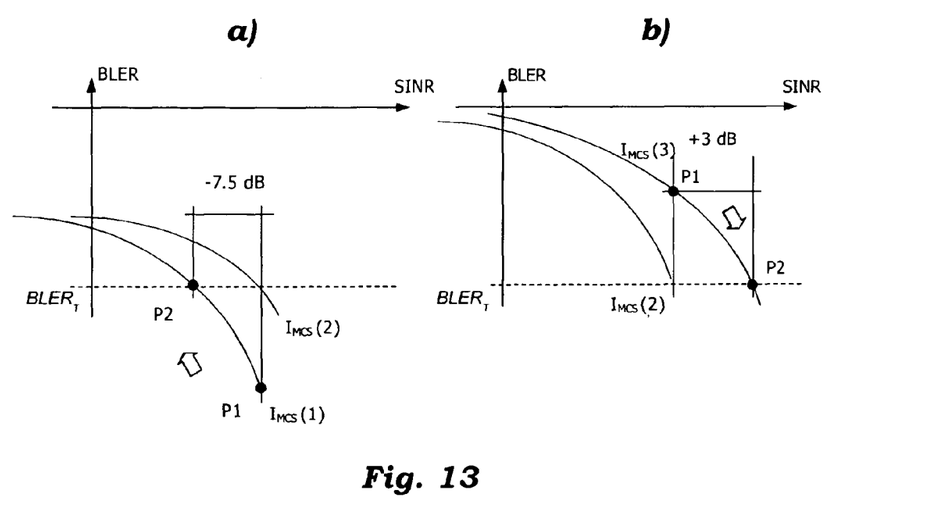

FIGS. 13a and 13b show in that respect a possible power adjustment for both variants.

In various embodiments, the block 110 adjusts the power level in order to restore the expected target block error rate $BLER_T$.

In the example shown in FIG. 13a, the MCS scheme has been changed from $I_{MCS}(2)$ to $I_{MCS}(1)$, and a lower BLER would be reached for the same power P1. Accordingly, the block 110 may reduce the power from P1 to P2, till the initial target block error rate $BLER_T$ is reached.

Conversely, in the example shown in FIG. 13b, the MCS scheme has been changed from $I_{MCS}(2)$ to $I_{MCS}(3)$, and a higher BLER would be reached for the same power P1. Accordingly, the block 110 may increase the power from P1 to P2, till the initial target block error rate $BLER_T$ is reached.

In various embodiments, the block 110 changes the PDSCH EPRE level in order to reach the same target BLER as in the initial scheduling phase (before MCS remapping) and compensate the power change due to the MCS remapping.

In fact, the needed power change should be at least equal to a(i,j).

However, the inventors have noted that this power change does not take into account the effect of the MCS remapping on the transmission power, which is expressed by the parameters b(i,j).

Accordingly, in various embodiments, the block 110 evaluates the total transmitted power change, which is given by the sum of a(i,j) and b(i,j).

In various embodiments, the block 110 calculates for each selected transport block $TB_k$ (with preliminary transmission format i) and for each possible new transmission format j, the following parameter:

$$\Delta G(i,j) = a(i,j) + b(i,j)$$

This parameter represents the overall power balance for the considered transport block $TB_k$, and two cases may happen:
- If $\Delta G(i, j) \geq 0$, the resulting transmitted power after MCS remapping and power adjustment is increased, and the j-th transmission format is skipped, because it is not suitable to improve the energy efficiency of the eNB transmission; or
- If $\Delta G(i,j) < 0$, the resulting transmitted power after MCS remapping and power adjustment is decreased, and the j-th transmission format is suitable to improve the energy efficiency of the eNB transmission. Accordingly, this transmission format is selected as a possible candidate transmission format for $TB_k$;

In various embodiments, the value $\Delta G(i,j)$ is compared with a minimum threshold Th<0 dB that may correspond to a minimum power saving target for the considered $TB_k$. For example, the threshold Th may take into account possible uncertainties in the link layer models.

In various embodiments, the block 110 evaluates the terms $\Delta G(i, j)$ for each selected $TB_k$. If some terms $\Delta G(i, j)$ are negative, then the best transmission format $j_{BEST}$ may be chosen (for example the minimum term, i.e. with the maximum power saving, since a negative value means power decrease).

Accordingly, the best value $\Delta G_{BEST}$ may be calculated as:

$$\Delta G_{BEST} = a(i,j_{BEST}) + b(i,j_{BEST})$$

and the power level of PDSCH EPRE may be updated as follows:

$$p_{output}(k) = p_{input}(k) + a(i,j_{BEST})$$

For example, considering the above exemplary transmission formats:
Transmission format #0, $(I_{TBS}, N_{PRB}) = (4,1)$,
Transmission format #1, $(I_{TBS}, N_{PRB}) = (1,2)$,
Transmission format #2, $(I_{TBS}, N_{PRB}) = (0,3)$,
a possible solution may be to increase redundancy by changing the transmission format for transport block $TB_1$ from $I_{MCS}(1)$ to $I_{MCS}(2)$, with $a(1,2) = -7.5$ dB and $b(1,2) = +1.76$ dB. Accordingly $\Delta G(1,2)$ would be:

$$\Delta G(1,2) = -7.5 \text{ dB} + 1.76 \text{ dB} = -5.74 \text{ dB}$$

and the total transmission power for the transport block $TB_1$ could be decreased.

However, a possible solution may also be to decrease redundancy by changing the transmission format for transport block $TB_1$ from $I_{MCS}(1)$ to $I_{MCS}(0)$, with $a(1,0) = +3$ dB and $b(1,0) = -3$ dB. Accordingly $\Delta G(1,0)$ would be:

$$\Delta G(1,0) = +3 \text{ dB} - 3 \text{ dB} = 0 \text{ dB}$$

and the total transmission power for the transport block $TB_1$ would remain substantial the same.

Consequently, when considering all possible solutions for the transport block $TB_1$, the block 110 would select $\Delta G_{BEST} = -5.74$ dB (with j=2), and the updated transmission format for the transport block $TB_1$ would be the couple $(I_{TBS}, N_{PRB}) = (0,3)$, and the updated power level of PDSCH EPRE would be changed to $p_{output}(1) = p_{input}(1) - 7.5$ dB.

Generally, multiple TB could be re-assigned by the EE post-elaboration block 110. In this case, conflicts in the PRB assignments could be managed by comparing the overall power saving obtained with all the possible resource allocation solutions in the considered TTI.

For example, in various embodiments, the block 110 determines for the possible solutions for a given TTI, an aggregated gain function by summing the individual gain functions $\Delta G_{BEST}^{(k)}$ of the candidate transport block:

$$\Delta G_{sum} = \sum_k \Delta G_{BEST}^{(k)}.$$

The block 110 may thus compare the different TTI solutions by selecting the best overall gain $\Delta G_{sum}$, e.g. by means of an iterative search of the best solution that maximizes the overall power saving.

Finally, the block 110 may output the updated values, which may also be the same as the original values, because the EE post-elaboration is subjected to the evaluation of two conditions:
- selection of the transport blocks suitable for the application of the EE post-elaboration; and
- selection of the best transmission format in order to increase energy efficiency;

Generally, it is possible that there are no suitable transport blocks for the EE post-elaboration, and/or that the conventional scheduler at the input has already chosen a good transmission format in terms of energy efficiency. In this case the proposed block does not change any preliminary scheduling/resource allocation decision, and no operation are performed on the transport blocks.

On the other hand, if such post-elaboration is performed, the block produces at the output the same expected throughput, but with lower power consumption for the processed transport block, and the total power saving for the eNB downlink transmission is given by the sum of all the contributions of the selected transport blocks in each considered TTI.

In various embodiments, the block 110 may also free part or all of the transport blocks and re-allocate them by selecting the solution, which provides the best overall gain as described in the foregoing Without prejudice to the underlying principles of the invention, the details and the embodiments may vary, even appreciably, with respect to what has been described by way of example only, without departing from the scope of the invention as defined by the annexed claims.

The invention claimed is:

1. A method of scheduling data transmission of transport blocks in an Orthogonal Frequency-Division Multiple Access communication system, wherein each of said transport blocks is transmitted with a respective transmission format and transmission power in a set of physical resource blocks in a frequency domain, wherein the method comprises:
  identifying, by a base station, a relationship between transmission power and block error rate for a set of transmission formats, and
  evaluating, by the base station, alternative transmission formats and different numbers of physical resource blocks for at least one of said transport blocks by performing the steps of:
   a) determining for said transport block a set of alternative transmission formats with a different number of physical resource blocks, b) if said set of alternative transmission formats with the different number of physical resource blocks is not empty, determining as a function of said relationship for at least one of said alternative transmission formats and different numbers of physical resource blocks a value indicating a total power difference required to transmit said transport block with said alternative transmission format and said different number of physical resource blocks, while ensuring a target block error rate, and c) if said value indicates that a total transmission power is less, scheduling for transmission said transport block with said alternative transmission format and said different number of physical resource blocks.

2. The method of claim 1, wherein said transport block has a transport block size, and wherein said determining the set of alternative transmission formats includes determining the alternative transmission formats and numbers of physical resource blocks, allowed to be used to transmit said transport block size of said transport block.

3. The method of claim 1, comprising determining, by the base station, for each of the alternative transmission formats and numbers of physical resource blocks in said set of alternative transmission formats and numbers of physical resource blocks a value indicating the total power difference, and scheduling for transmission said transport block with the alternative transmission format and number of physical resource blocks, which provides the best transmission power gain.

4. The method of claim 1, wherein said determining the set of alternative transmission formats includes determining a set of unused physical resource blocks, which is allowed to be used to transmit said transport block.

5. The method of claim 4, wherein said determining the set of unused physical resource blocks includes determining a set of channel quality indicators for said physical resource blocks and comparing the channel quality indicators of said unused physical resource blocks with an aggregated channel quality indicator index determined as a function of the channel quality indicators of the physical resource blocks in said set of physical resource blocks of said transport block.

6. The method of claim 1, wherein said determining the value indicating the total power difference includes:
determining a value indicating a gain when changing to said alternative transmission format, while maintaining the same target block error rate,
determining a value indicating the gain when changing to said different number of physical resource blocks, and
calculating said total power difference as a sum of said value indicating the gain when changing to said alternative transmission format and said value indicating the gain when changing to said different number of physical resource blocks.

7. The method of claim 1, comprising modifying, by the base station, said transmission power in order to transmit said transport block with the same target block error rate.

8. The method of claim 1, comprising:
evaluating, by the base station, alternative transmission formats and different numbers of physical resource blocks for each transport block in a given transmission time interval,
calculating, by the base station, an aggregated gain function for each possible combination of alternative transmission formats and different numbers of physical resource blocks for said transport blocks, and
selecting, by the base station, the combination which provides the best aggregated gain.

9. A base station for scheduling data transmission of transport blocks in an Orthogonal Frequency-Division Multiple Access communication system, wherein each of said transport blocks is transmitted with a respective transmission format and transmission power in a set of physical resource block in a frequency domain, wherein the base station comprises:
a processing unit; and
a memory having software code stored thereon that, when executed by the processing unit, perform the steps of:
identifying a relationship between transmission power and block error rate for a set of transmission formats, and
evaluating alternative transmission formats and different numbers of physical resource blocks for at least one of said transport blocks by performing the steps of:
a) determining for said transport block a set of alternative transmission formats with a different number of physical resource blocks,
b) if said set of alternative transmission formats with the different number of physical resource blocks is not empty, determining as a function of said relationship for at least one of said alternative transmission formats and different numbers of physical resource blocks a value indicating a total power difference required to transmit said transport block with said alternative transmission format and said different number of physical resource blocks, while ensuring a target block error rate, and
c) if said value indicates that a total transmission power is less, scheduling for transmission said transport block with said alternative transmission format and said different number of physical resource blocks.

10. The base station of claim 9, wherein said base station is an extended Node B of a Long Term Evolution or Long Term Evolution-Advanced communication network.

11. A non-transitory computer readable storage medium including software code portions stored thereon that, when executed by a computer, perform the steps of:
identifying a relationship between transmission power and block error rate for a set of transmission formats, and
evaluating alternative transmission formats and different numbers of physical resource blocks for at least one of transport blocks in an Orthogonal Frequency-Division Multiple Access communication system by performing the steps of:
a) determining for a transport block a set of alternative transmission formats with a different number of physical resource blocks,
b) if said set of alternative transmission formats with the different number of physical resource blocks is not empty, determining as a function of said relationship for at least one of said alternative transmission formats and different numbers of physical resource blocks a value indicating a total power difference required to transmit said transport block with said alternative transmission format and said different number of physical resource blocks, while ensuring a target block error rate, and
c) if said value indicates that a total transmission power is less, scheduling for transmission said transport block with said alternative transmission format and said different number of physical resource blocks.

12. The base station of claim 9, wherein said transport block has a transport block size, and wherein said determining the set of alternative transmission formats includes determining the alternative transmission formats and numbers of physical resource blocks, allowed to be used to transmit said transport block size of said transport block.

13. The base station of claim 9, wherein the software code when executed by the processing unit further performs the step of determining for each of the alternative transmission formats and numbers of physical resource blocks in said set of alternative transmission formats and numbers of physical resource blocks a value indicating the total power difference, and scheduling for transmission said transport block with the alternative transmission format and number of physical resource blocks, which provides the best transmission power gain.

14. The base station of claim 9, wherein said determining the set of alternative transmission formats includes determining a set of unused physical resource blocks, which is allowed to be used to transmit said transport block.

15. The base station of claim 14, wherein said determining the set of unused physical resource blocks includes determining a set of channel quality indicators for said physical resource blocks and comparing the channel quality indicators of said unused physical resource blocks with an aggregated channel quality indicator index determined as a function of the channel quality indicators of the physical resource blocks in said set of physical resource blocks of said transport block.

16. The base station of claim 9, wherein said determining the value indicating the total power difference includes:
   determining a value indicating a gain when changing to said alternative transmission format, while maintaining the same target block error rate,
   determining a value indicating the gain when changing to said different number of physical resource blocks, and
   calculating said total power difference as a sum of said value indicating the gain when changing to said alternative transmission format and said value indicating the gain when changing to said different number of physical resource blocks.

17. The base station of claim 9, wherein the software code when executed by the processing unit further performs the step of modifying said transmission power in order to transmit said transport block with the same target block error rate.

18. The base station of claim 9, wherein the software code when executed by the processing unit further performs the steps of:
   evaluating alternative transmission formats and different numbers of physical resource blocks for each transport block in a given transmission time interval,
   calculating an aggregated gain function for each possible combination of alternative transmission formats and different numbers of physical resource blocks for said transport blocks, and
   selecting the combination which provides the best aggregated gain.

19. The non-transitory computer readable storage medium of claim 11, wherein said transport block has a transport block size, and wherein said determining the set of alternative transmission formats includes determining the alternative transmission formats and numbers of physical resource blocks, allowed to be used to transmit said transport block size of said transport block.

20. The non-transitory computer readable storage medium of claim 11, wherein the software code portions when executed by the computer further performs the step of determining for each of the alternative transmission formats and numbers of physical resource blocks in said set of alternative transmission formats and numbers of physical resource blocks a value indicating the total power difference, and scheduling for transmission said transport block with the alternative transmission format and number of physical resource blocks, which provides the best transmission power gain.

* * * * *